Patented Dec. 12, 1922.

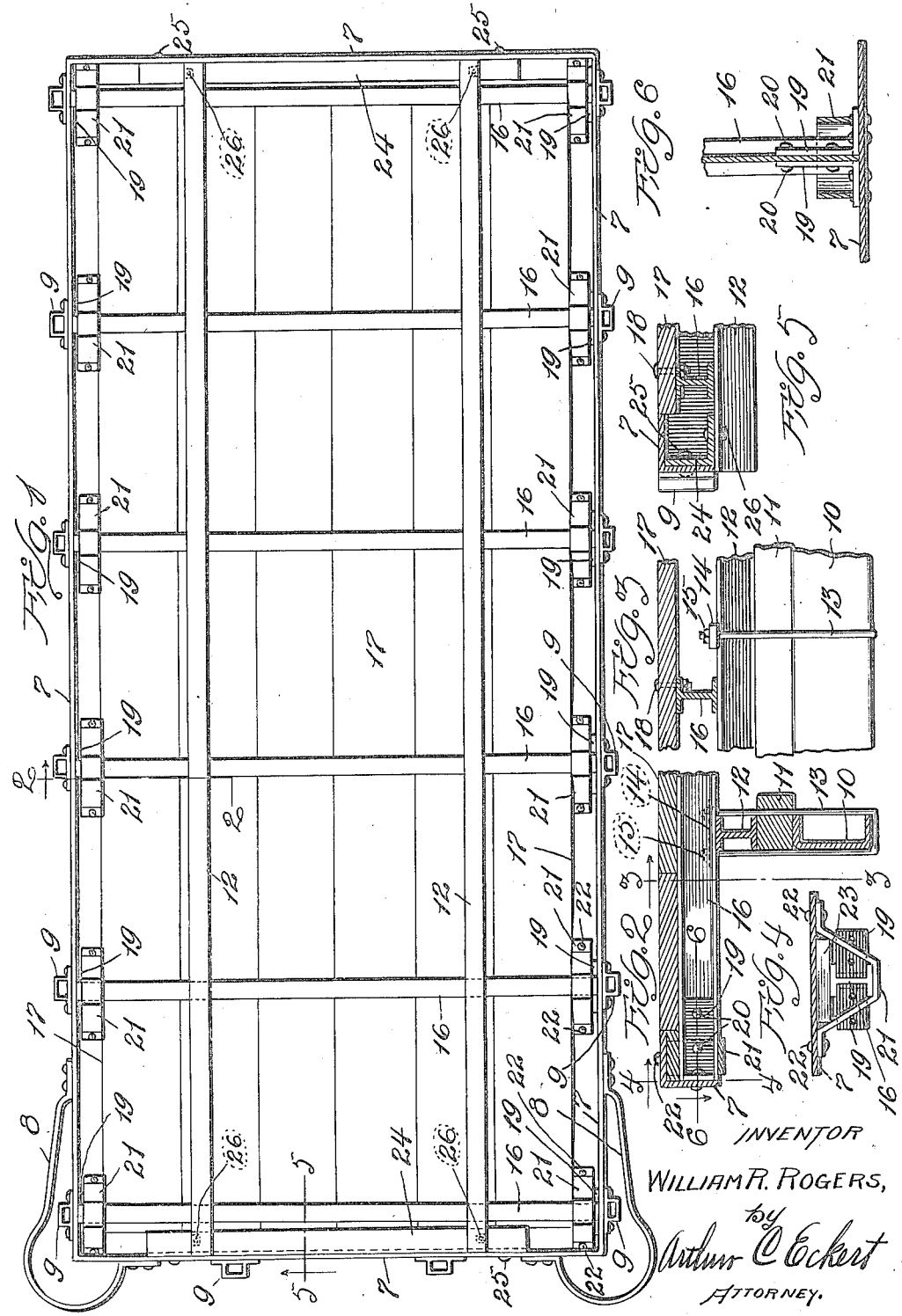

1,438,664

UNITED STATES PATENT OFFICE.

WILLIAM ROLLA ROGERS, OF ST. LOUIS, MISSOURI.

TRUCK FRAME.

Application filed November 24, 1920. Serial No. 426,304.

*To all whom it may concern:*

Be it known that WILLIAM ROLLA ROGERS, a citizen of the United States of America, residing at 5912 Pershing Avenue, in the city of St. Louis and State of Missouri, has invented certain new and useful Improvements in Truck Frames, of which the following is a specification.

The object of my invention is to manufacture a wagon bed or truck bed which will be simple in manufacture, relatively low in manufacturing cost, durable, and able to withstand rough usage and wear.

With the above and other objects in view my invention has relation to certain novel features of construction and arrangements of parts as will be hereinafter more fully described, pointed out in the claims and illustrated in the drawings in which—

Fig. 1 is an inverted plan view of my vehicle bed,

Fig. 2 is a fragmental cross-section on the line 2—2 of Fig. 1,

Fig. 3 is a fragmental cross-section on the line 3—3 of Fig. 2,

Fig. 4 is a cross-section on the line 4—4 of Fig. 2,

Fig. 5 is fragmental cross-section along the line 5—5 of Fig. 1 and

Fig. 6 is a cross-section along the line 6—6 of Fig. 2.

Numeral 7 indicates a metal frame of rectangular shape having its ends welded together and of the size of the vehicle bed; the frame is of L cross-section. The bumper 8 and the stake sockets 9, are secured to the frame 7 by bolts or rivets. Numeral 10 indicates a longitudinal chassis member on which is positioned the sub-sill 11, on which in turn is positioned the riser 12. The chassis member 10 is of U section as best shown in Fig. 2; the sill 11 is of rectangular structure as best shown in Fig. 2 and the riser 12 is an I beam as best shown in Fig. 2. The chassis member 10, the subsill 11 and the riser 12 are held together by means of the U strap 13 which terminates in two threaded ends which are positioned in holes in the flange of the cross-sill 16 and secured by the plate 14 and the nuts 15, the ends of the strap 13 passing thru holes in the plate 14.

Numeral 16 indicates cross-sills which are positioned on the risers 12 transversely and which are I beams. To the cross-sills 16, the floor 17 is secured by means of the bolts 18; the floor external surface and the surface of the frame 7 are flush forming a continuous flat surface. The cross-sills 16 at their ends are secured to the frame 7 by means of the angle irons 19 and the rivets 20 as best shown in Fig. 6. As an additional means of securing the cross-sills 16 to the frame 7, the hangers 21 are provided which are secured to the frame 7 by the rivets 22 as best shown in Fig. 4. A spacer such as 23 is positioned between the cross-sill 16 and the frame 7. As an additional means of strengthening the rear or left end of the frame shown in Fig. 1, a supplemental angle iron 24 is provided which is secured to the frame 7 by rivets 25 and to the riser 12 by the rivets 26, which is best shown in Fig. 5.

What I claim and mean to secure by Letters Patent is:

1. In a vehicle bed, an integral rectangular frame of L section having its ends welded together, a floor secured to the frame, bumpers and stake pockets riveted to said frame, cross sills secured at their ends to said frame, said floor secured by bolts to said cross sills, risers, said cross sills having an I section and secured to said risers transversely, sub-sills secured to said risers, a chassis, the risers and sub-sills secured to said chassis and cross sills by means of straps.

2. In a vehicle bed, an integral rectangular frame having its ends welded together, a floor secured to the frame, bumpers and stake pockets secured to said frame, cross-sills secured at their ends to said frame, said floor secured to said cross-sills, risers, said cross-sills having an I section and secured to said risers transversely, sub-sills secured to said risers, chassis, the risers and sub-sills secured to said chassis and cross-sills by means of straps.

In testimony whereof I affix my signature.

WILLIAM ROLLA ROGERS.